US006199847B1

(12) United States Patent
Fukui

(10) Patent No.: US 6,199,847 B1
(45) Date of Patent: Mar. 13, 2001

(54) CYLINDER APPARATUS

(75) Inventor: Chiaki Fukui, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/421,556

(22) Filed: Oct. 20, 1999

(30) Foreign Application Priority Data

Oct. 20, 1998 (JP) .................................................. 10-298701

(51) Int. Cl.[7] ...................................................... B23Q 3/08
(52) U.S. Cl. ................................................ 269/32; 29/416
(58) Field of Search ................................. 269/32; 29/416

(56) References Cited

U.S. PATENT DOCUMENTS

| | | | | |
|---|---|---|---|---|
| 4,637,597 | * | 1/1987 | McPherson et al. | 269/32 |
| 4,905,973 | | 3/1990 | Blatt | 269/32 |
| 5,215,295 | * | 6/1993 | Hoover | 269/32 |
| 5,704,600 | * | 1/1998 | Robinson | 269/32 |
| 5,816,567 | * | 10/1998 | Horn | 269/32 |
| 5,829,112 | * | 11/1998 | Blatt | 29/416 |
| 5,996,984 | * | 12/1999 | Takahashi | 269/32 |

* cited by examiner

*Primary Examiner*—David A. Scherbel
*Assistant Examiner*—Hadi Shakeri
(74) *Attorney, Agent, or Firm*—Paul A. Guss

(57) ABSTRACT

Circular arc-shaped projections are formed on a support lever which is exposed to the outside through openings formed through a first casing and a second casing for constructing a body. The circular arc-shaped projections abut against plates which are coupled to the body. Accordingly, the rotary action of an arm is stopped.

7 Claims, 12 Drawing Sheets

CYLINDER APPARATUS

BACKGROUND OF THE INVENTION

1. Field of the Invention

The present invention relates to a cylinder apparatus capable of clamping a workpiece by using an arm which is rotatable by a predetermined angle in accordance with a displacement action of a piston.

2. Description of the Related Art

The cylinder apparatus has been hitherto used, for example, in order to clamp a constitutive part when the constitutive part of an automobile or the like is welded. Such an cylinder apparatus is disclosed, for example, in U.S. Pat. No. 4,905,973.

The cylinder apparatus disclosed in U.S. Pat. No. 4,905,973 is constructed as follows. That is, its main body is constructed by integrally combining a pair of casings which are formed substantially in a mutually symmetric manner. A cylinder unit is coupled to the main body. An arm is rotated by a predetermined angle by the aid of a toggle link mechanism provided at the inside of the main body in accordance with the driving action of the cylinder unit.

The toggle link mechanism includes a lever arm which is rotatable by a predetermined angle about a center of a rotation pin. The lever arm is provided with a stopper for making abutment against the inner wall surface of the casing to stop the rotary action of the arm when the arm is used to clamp a workpiece.

However, in the cylinder apparatus concerning the conventional technique disclosed in U.S. Pat. No. 4,905,973, the stopper for stopping the rotary action of the arm is provided at the inside of the casing. For this reason, it is necessary to disassemble the casing when the maintenance operation is performed for the stopper. Therefore, an inconvenience arises in that the maintenance operation for the stopper is complicated, and it cannot be performed efficiently.

SUMMARY OF THE INVENTION

A general object of the present invention is to provide a cylinder apparatus which makes it possible to perform the maintenance operation for the stopper conveniently and efficiently without disassembling a casing.

A principal object of the present invention is to provide a clamping apparatus which makes it possible to arbitrarily set an angle of an arm to give a clamping state by conveniently changing the range of rotary action of the arm.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
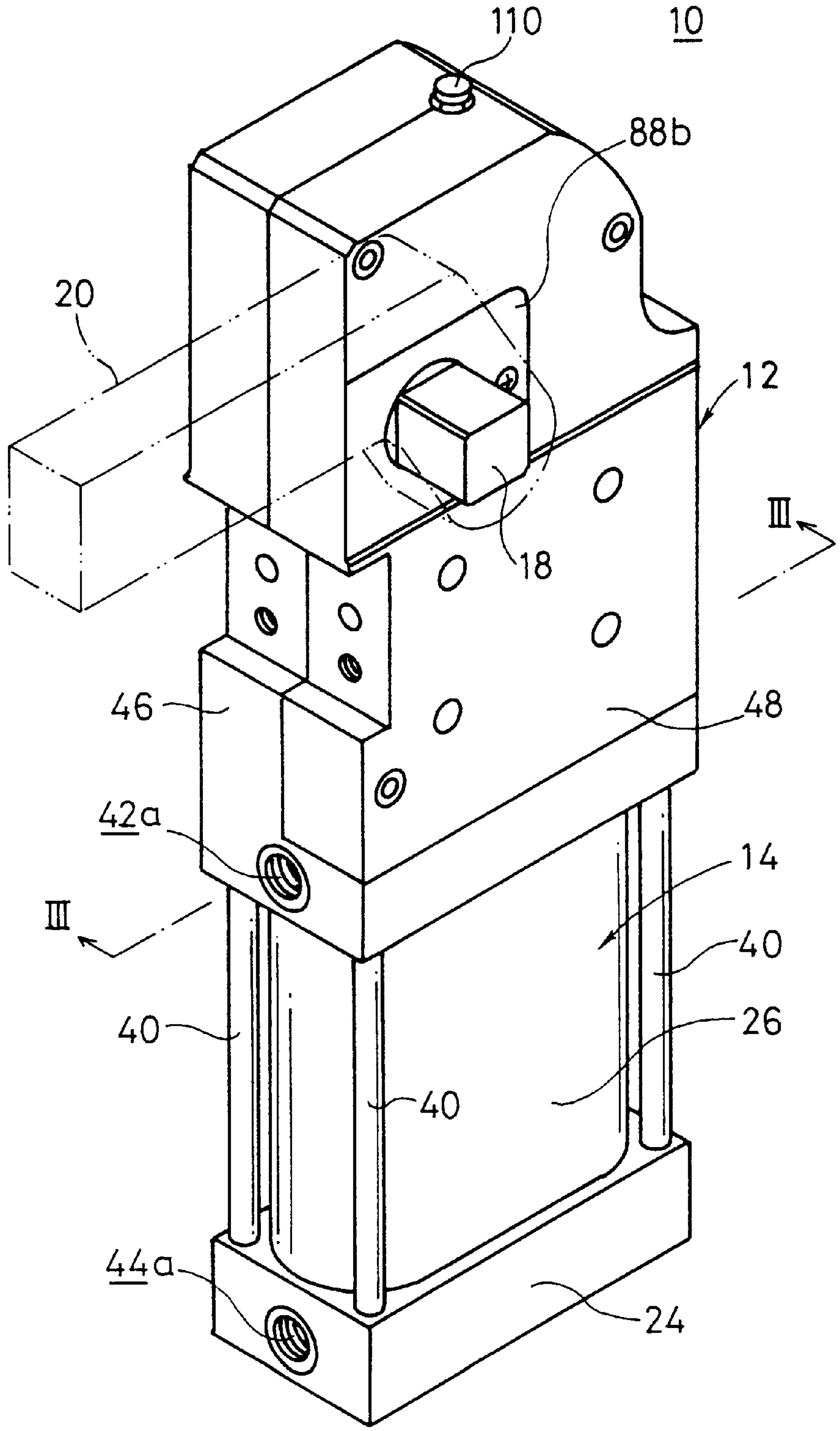
FIG. 1 shows a perspective view illustrating a cylinder apparatus according to an embodiment of the present invention.
Figure 2:
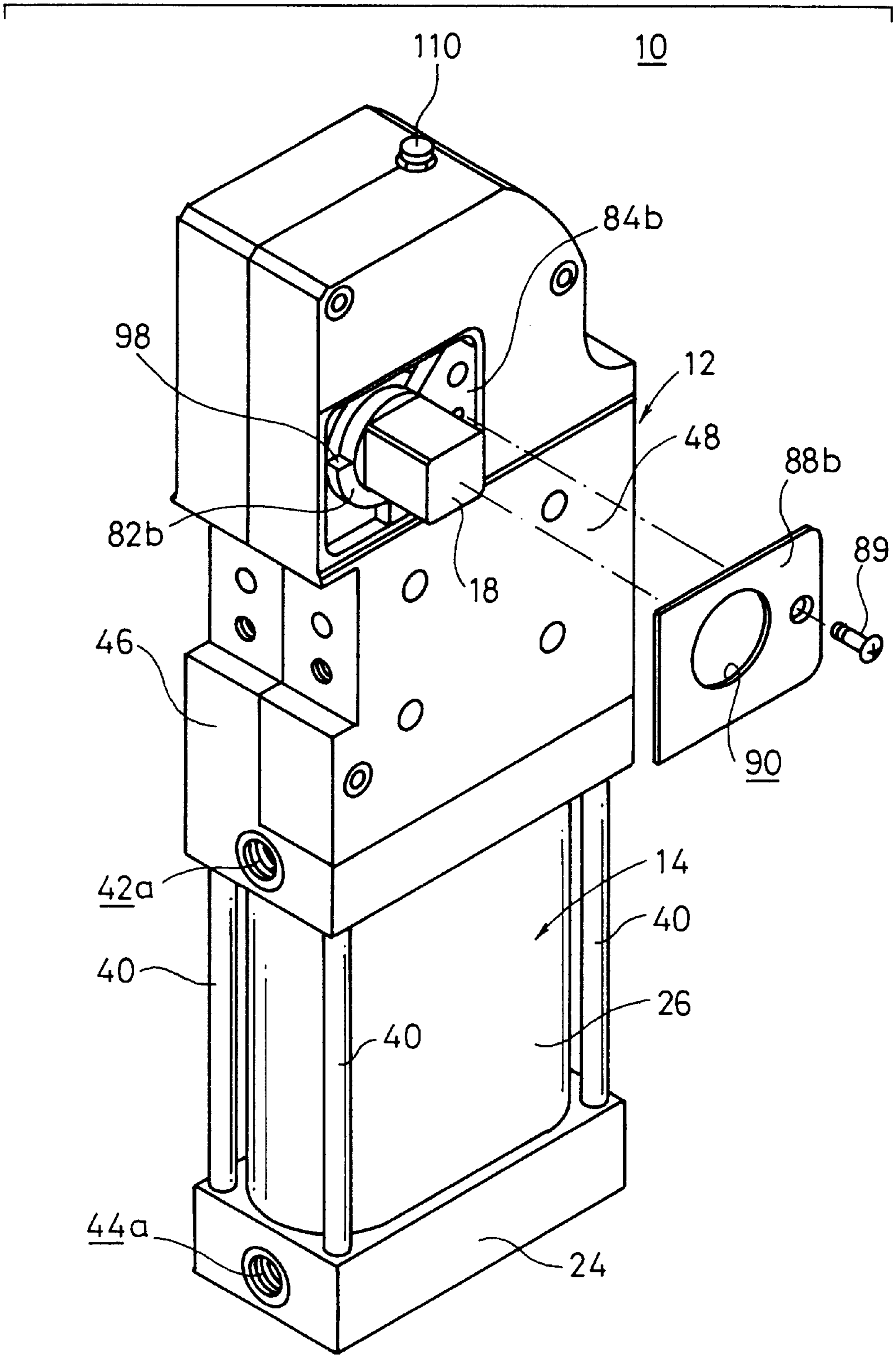
FIG. 2 shows an exploded perspective view illustrating a state in which a cover member is detached from a body of the cylinder apparatus.

With reference to FIG. 1, reference numeral 10 indicates a cylinder apparatus according to an embodiment of the present invention.

The cylinder apparatus 10 comprises a body 12 which is formed in an integrated manner to have a flat configuration, a cylinder unit 14 which is coupled in an air-tight manner to the lower end of the body 12, and an arm 20 which is coupled to a rectangular bearing section 18 protruding to the outside through a pair of substantially circular openings 16*a*, 16*b* (see FIG. 4) formed through the body 12.

Figure 5:
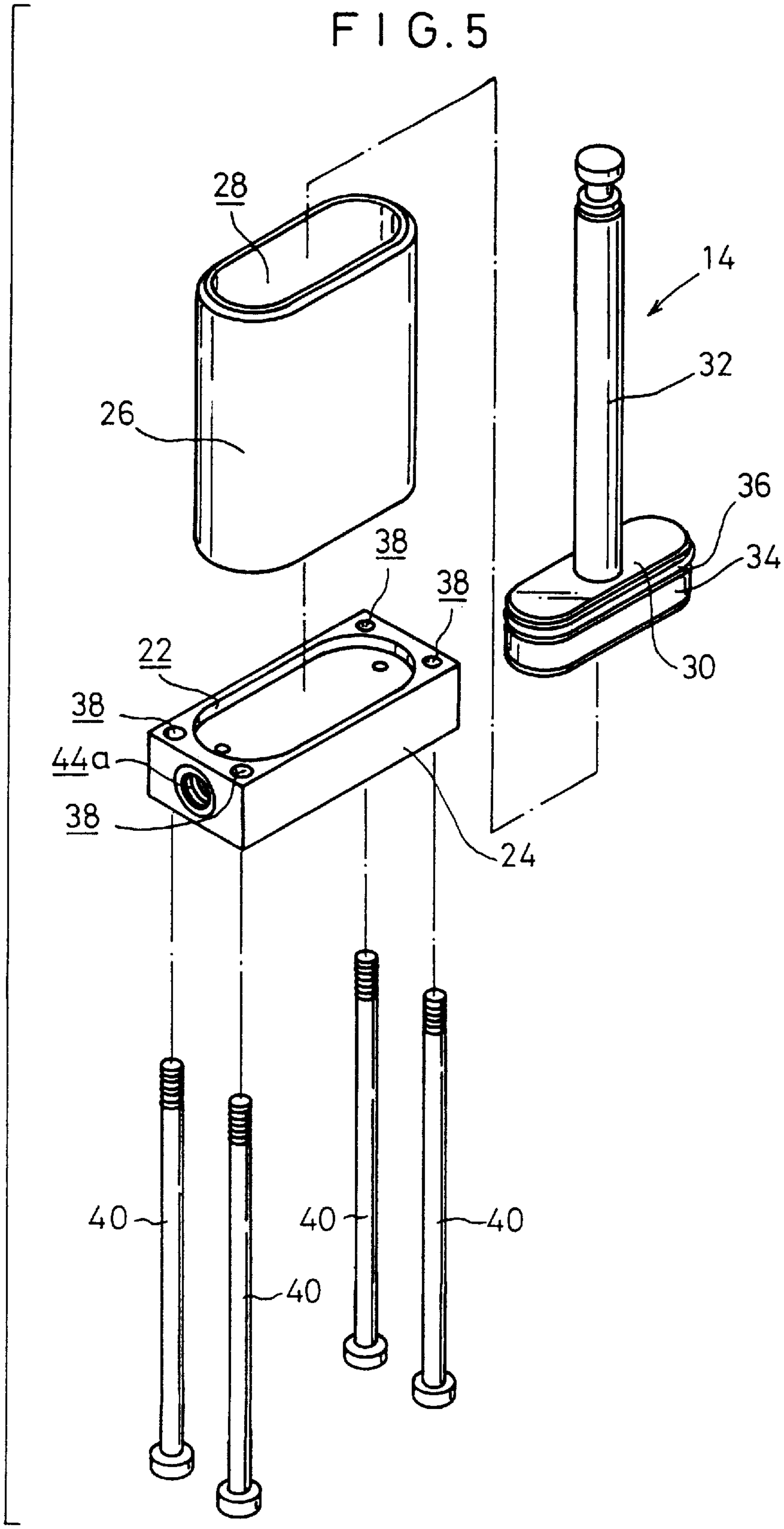
FIG. 5 shows an exploded perspective view illustrating a cylinder unit for constructing the cylinder apparatus.

As shown in FIG. 5, the cylinder unit 14 includes an end block 24 which has an elliptic recess 22 formed on its upper surface, and a cylinder tube 26 which is composed of a cylinder having an elliptic cross section with its first end coupled in an air-tight manner to the recess 22 of the end block 24 and with its second end coupled in an air-tight manner to the bottom surface of the body 12. The cylinder unit 14 further comprises a piston 30 which is accommodated in the cylinder tube 26 and which makes reciprocating movement along a cylinder chamber 28, and a piston rod 32 which is coupled to a central portion of the piston 30 to make the displacement integrally with the piston 30.

Figure 3:
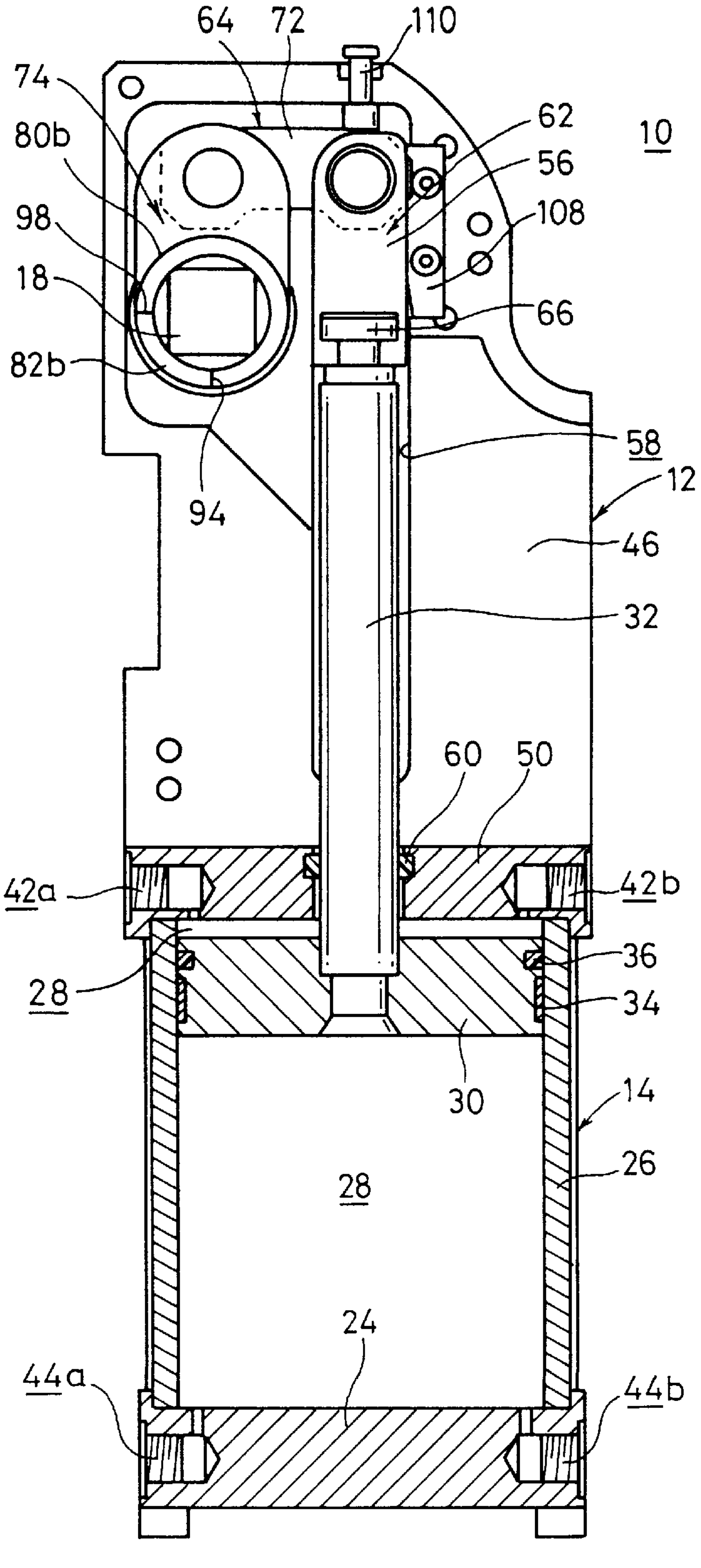
FIG. 3 shows a longitudinal sectional view taken along a line III—III shown in FIG. 1.

As shown in FIG. 5, a wear ring 34 and a seal ring 36 are installed to the outer circumferential surface of the piston 30 respectively. Attachment holes 38 are bored through four corner portions of the end block 24. The end block 24 and the cylinder tube 26 are assembled in an air-tight manner to the body 12 by the aid of four shafts 40 inserted through the attachment holes 38. Pairs of pressure fluid inlet/outlet ports 42*a*, 42*b*, 44*a*, 44*b*, which are used to introduce and discharge the pressure fluid (for example, compressed air) with respect to the cylinder chamber 28 respectively, are formed mutually opposingly in the body 12 and the end block 24 respectively (see FIG. 3).

When the cylinder apparatus 10 is practically used, blank caps are screwed into any pair of the pressure fluid inlet/outlet ports 42*a*, 44*a* (42*b*, 44*b*). Thus, the cylinder apparatus 10 is used in a state in which one of the pairs of pressure fluid inlet/outlet ports 42*a*, 44*a* (42*b*, 44*b*) are closed.

Figure 4:
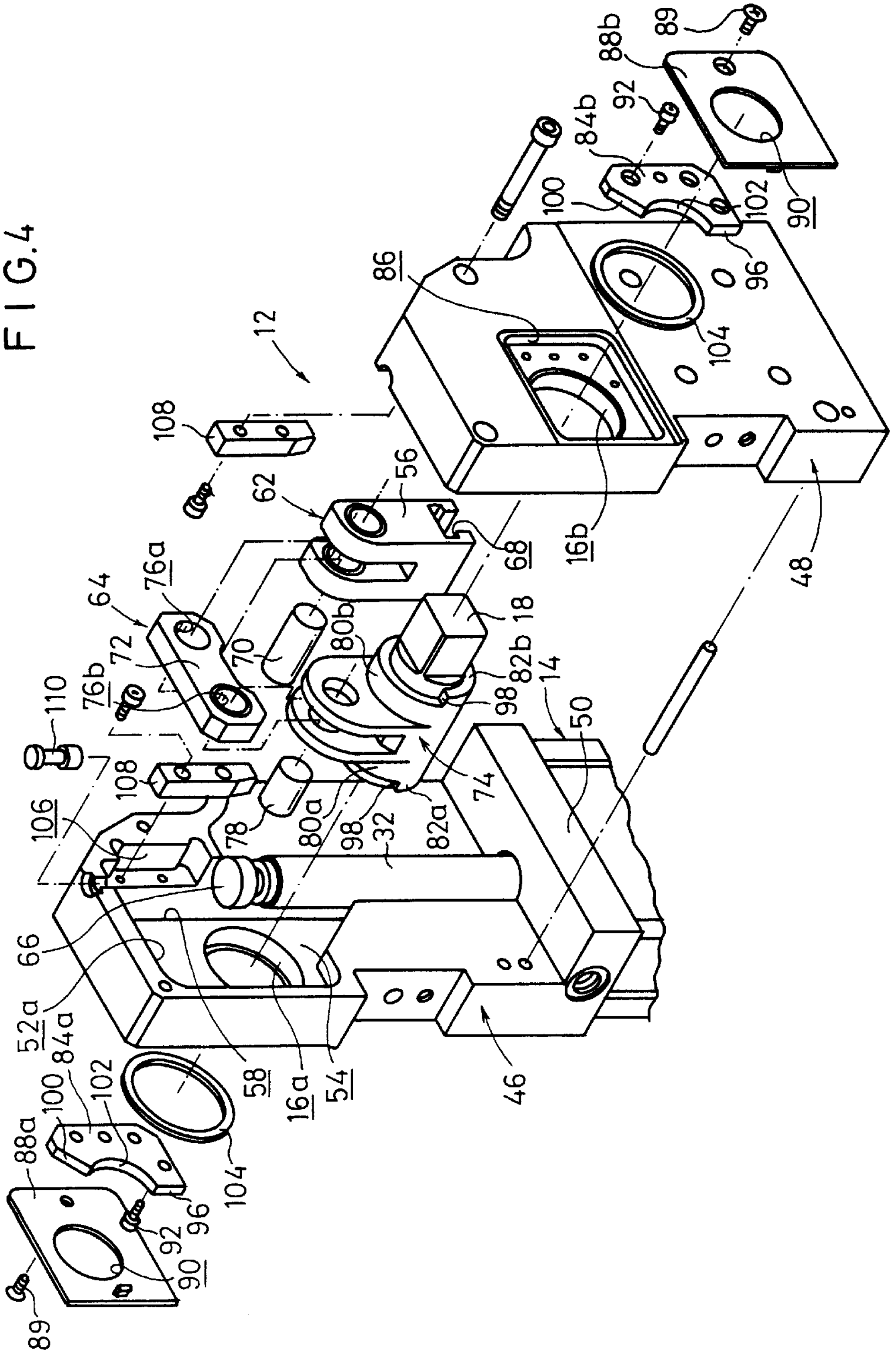
FIG. 4 shows an exploded perspective view illustrating the body for constructing the cylinder apparatus.

As shown in FIG. 4, the body 12 comprises a first casing 46 and a second casing 48 which are asymmetric and which are assembled in an integrated manner. A projection 50, which protrudes in a substantially horizontal direction and which functions as a rod cover, is formed in an integrated manner at the lower end of the first casing 46. The second casing 48 is formed to have a size in the longitudinal direction which is shortened by a thickness of the projection 50 as compared with the first casing 46. In this arrangement, as shown in FIG. 4, the body 12 can be conveniently disassembled by detaching the second casing 48 from the first casing 46 without disassembling the cylinder unit 14.

As shown in FIG. 4, a chamber 54 is formed in the body 12 by recesses 52*a*, 52*b* formed for the first casing 46 and the second casing 48 respectively (provided that the recess 52*b* is omitted from the illustration because it has the same structure as that of the recess 52*a*). The free end of the piston rod 32 is provided to face in the chamber 54. In this arrangement, the piston rod 32 is guided linearly reciprocatively by the aid of guide grooves 58 which are formed on the respective inner wall surfaces of the first casing 46 and the second casing 48 and on which a knuckle block 56 described later on is slidable, and a rod packing 60 (see FIG. 3) which is provided at a through-hole of the projection 50 for inserting the piston rod 32 therethrough.

As shown in FIG. 4, a toggle link mechanism 64, which is used to convert the rectilinear motion of the piston rod 32 into the rotary motion of the arm 20 by the aid of a knuckle joint 62, is provided at a first end of the piston rod 32. The knuckle joint 62 comprises a knuckle pin 66 having a disk-shaped projection coupled to the first end of the piston rod 32, and the knuckle block 56 having a forked section with branches separated by a predetermined distance and branched substantially in parallel to one another.

A groove 68 having a T-shaped cross section, with which the disk-shaped projection of the knuckle pin 66 is engaged, is formed at a bottom surface portion of the knuckle block 56 to extend in a substantially horizontal direction. In this arrangement, the projection of the knuckle pin 66, which is coupled to the first end of the piston rod 32, is provided slidably in the substantially horizontal direction along the groove 68. Accordingly, any backlash of the piston rod 32 in the lateral direction can be absorbed. Therefore, any backlash, which occurs in the cylinder unit 14, fails to be transmitted to the toggle link mechanism 64 and the arm 20.

As shown in FIG. 4, the toggle link mechanism 64 includes a link plate 72 which is coupled to the forked section of the knuckle joint 62 by the aid of a first pin member 70, and a support lever 74 which is rotatably supported by the pair of substantially circular openings 16*a*, 16*b* formed through the first casing 46 and the second casing 48 respectively.

The link plate 72 is allowed to intervene between the knuckle joint 62 and the support lever 74, and it functions to link the knuckle joint 62 and the support lever 74. Specifically, the link plate 72 is formed with a pair of holes 76*a*, 76*b* which are separated from each other by a predetermined spacing distance. The link plate 72 is coupled to the free end of the piston rod 32 via the knuckle joint 62 and the first pin member 70 rotatably attached to the first hole 76*a*. The link plate 72 is coupled to the forked section of the support lever 74 via a second pin member 78 rotatably attached to the second hole 76*b*.

The support lever 74 includes a forked section which is formed with holes for rotatably attaching the second pin member 78, the bearing section 18 which is formed to protrude in a direction substantially perpendicular to the axis of the piston rod 32 and which has a rectangular cross section exposed to the outside from the body 12 through the opening 16*b*, a pair of circumferential sections 80*a*, 80*b* which are formed adjacently with the forked section interposed therebetween and which are fitted to the substantially circular openings 16*a*, 16*b* of the body 12 respectively, and a pair of circular arc-shaped projections 82*a*, 82*b* which are formed to slightly protrude in the lateral direction from the circumferential sections 80*a*, 80*b* and which are exposed to the outside from the body 12 through the openings 16*a*, 16*b* respectively. The arm 20 for claiming an unillustrated workpiece is detachably installed to the bearing section 18.

The support lever 74 is provided to make the rotary action integrally with the arm 20. The circular arc-shaped projections 82*a*, 82*b*, which are formed on the support lever 74, abut against plates 84*a* 84*b* fixed to the body 12 (as described later on). Accordingly, the circular arc-shaped projections 82*a*, 82*b* function as the stopper for stopping the rotary action of the arm 20.

The rectilinear motion of the piston rod 32 is transmitted to the support lever 74 via the knuckle joint 62 and the link plate 72. The support lever 74 is provided rotatably by a predetermined angle about the center of rotation of the circumferential sections 80*a*, 80*b* which are supported by the pair of openings 16*a*, 16*b* formed through the body 12.

As shown in FIG. 4, oblong recesses 86 are formed on the side surfaces of the first casing 46 and the second casing 48 for constructing the body 12 respectively. The recesses 86 are closed by a pair of cover members 88*a*, 88*b*. The cover members 88*a*, 88*b* are installed detachably by the aid of screw members 89. In this arrangement, the bearing section 18 of the support lever 74 is provided to be exposed to the outside through a substantially circular opening 90 which is formed at a substantially central portion of the cover member 88*b*.

The plates 84*a*, 84*b*, which make abutment against the circular arc-shaped projections 82*a*, 82*b* of the support lever 74 to stop the rotary action of the arm 20, are fixed on the wall surfaces of the recesses 86 by the aid of screw members 92.

Figure 6:
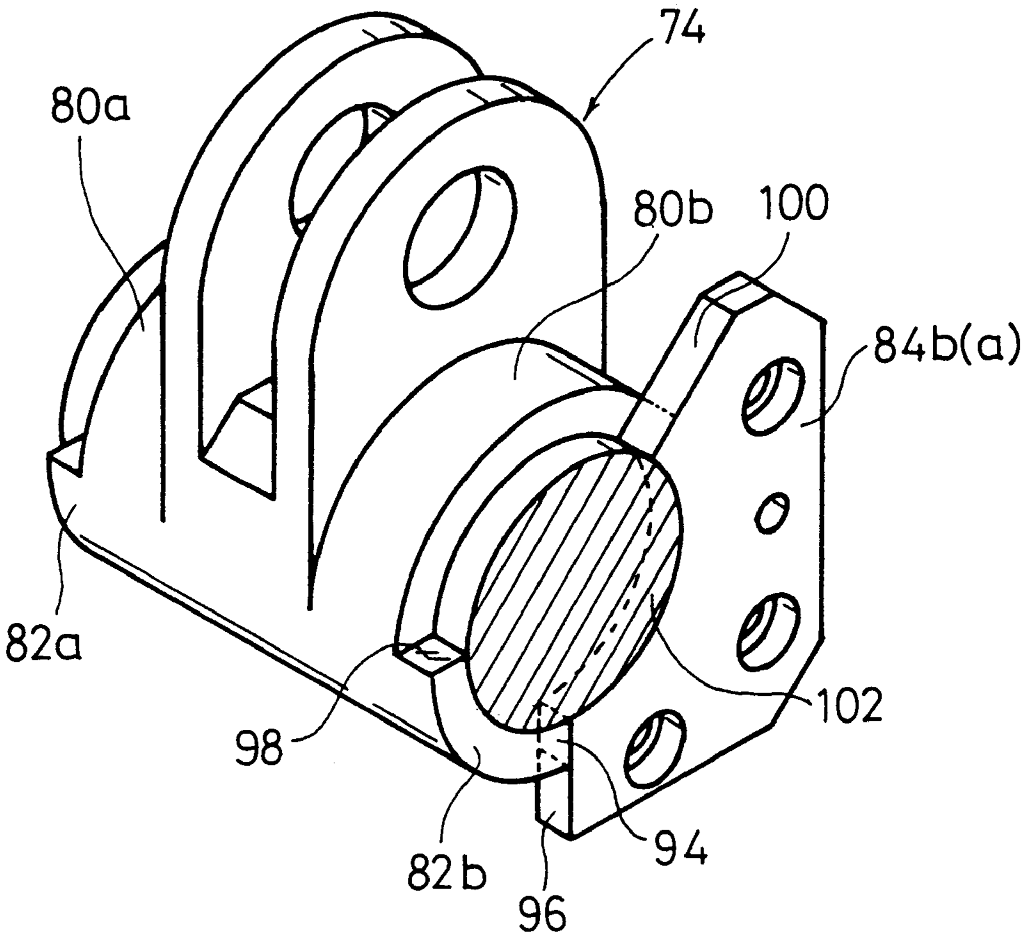
FIG. 6 shows a perspective view with partial cutout illustrating a state in which a circular arc-shaped projection of a support lever abuts against a plate.

As shown in FIG. 6, the plate 84*b* (84*a*) has a first abutment surface 96 for making abutment against a first end surface 94 of the circular arc-shaped projection 82*b* (82*a*), and a second abutment surface 100 for making abutment against a second end surface 98 of the circular arc-shaped projection 82*b* (82*a*). A curved surface 102 for surrounding the support lever 74 is formed between the first abutment surface 96 and the second abutment surface 100. The first end surface 94 and the second end surface 98 of the support lever 74 are formed so that they are separated from each other by an angle of about 90 degrees.

As shown in FIG. 4, a ring-shaped scraper 104 is installed via an annular step to each of the substantially circular openings 16*a*, 16*b* of the first casing 46 and the second casing 48 in order to prevent the chamber 54 of the body 12 from invasion of any dust or the like.

Recesses 106 having a rectangular cross section are formed at upper corner portions of the inner wall surfaces of the first casing 46 and the second casing 48 for constructing the body 12 respectively. A pair of reaction force-receiving plates 108 are fixed by screw members to the recesses 106, for receiving the reaction force upon the abutment of the knuckle joint 62 when the clamping state is given. The pair of guide grooves 58, which are composed of rectangular grooves and which extend in the vertical direction, are provided mutually opposingly on the inner wall surfaces of the first casing 46 and the second casing 48. The knuckle block 56 is interposed between the pair of guide grooves 58.

The knuckle block 56 is provided slidably in the vertical direction in accordance with the guiding action of the guide grooves 58.

As shown in FIG. 4, a manual release pin 110 is provided at an upper portion of the body 12, for releasing the cylinder apparatus 10 from the clamping state to restore it to the unclamping state when the manual release pin 110 is pressed downwardly by an operator in accordance with the manual operation.

The cylinder apparatus 10 according to the embodiment of the present invention is basically constructed as described above. Next, its operation, function, and effect will be explained.

Figure 7:
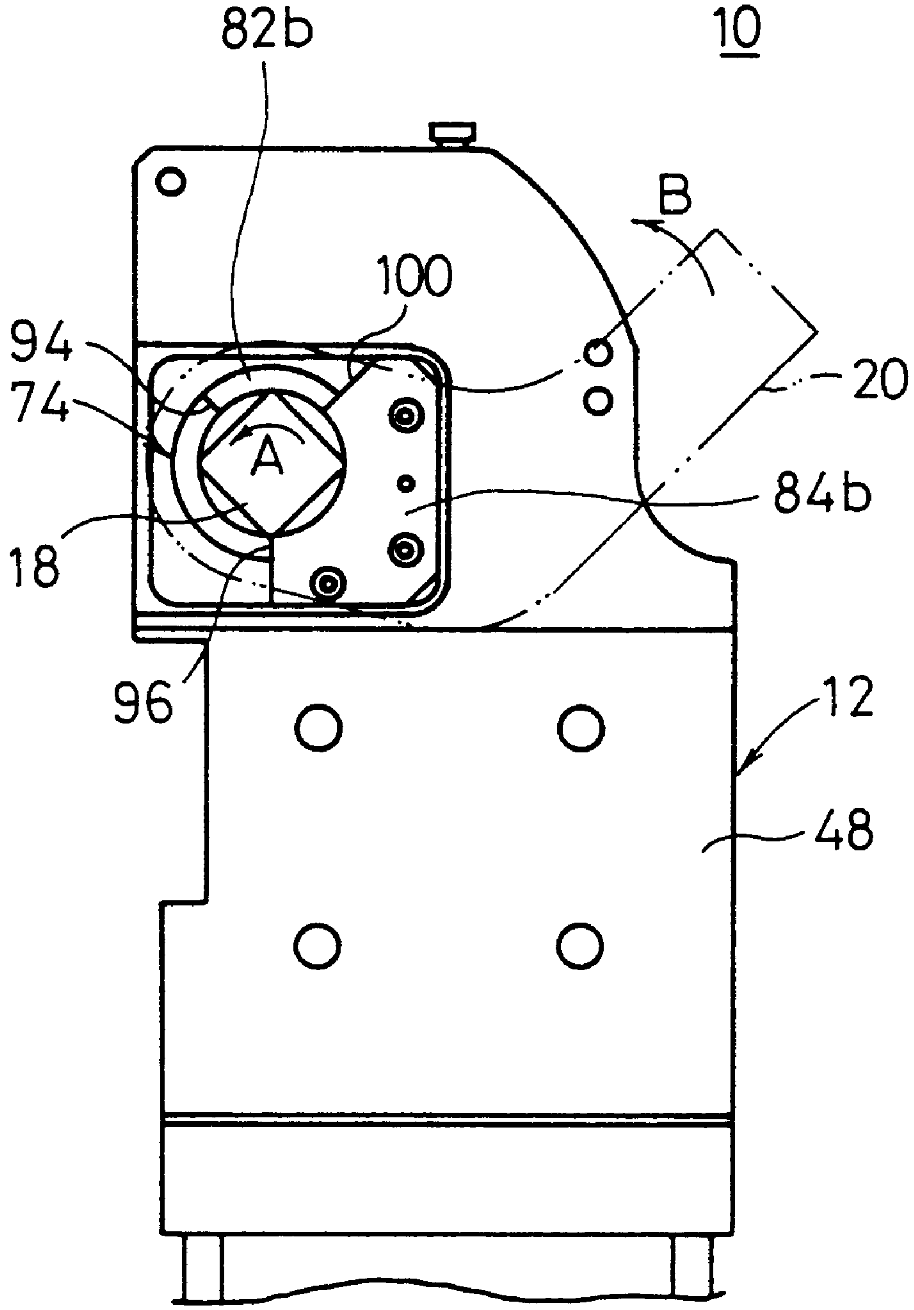
FIG. 7 illustrates the action, depicting a state obtained when the arm is at the initial position.
Figure 10:
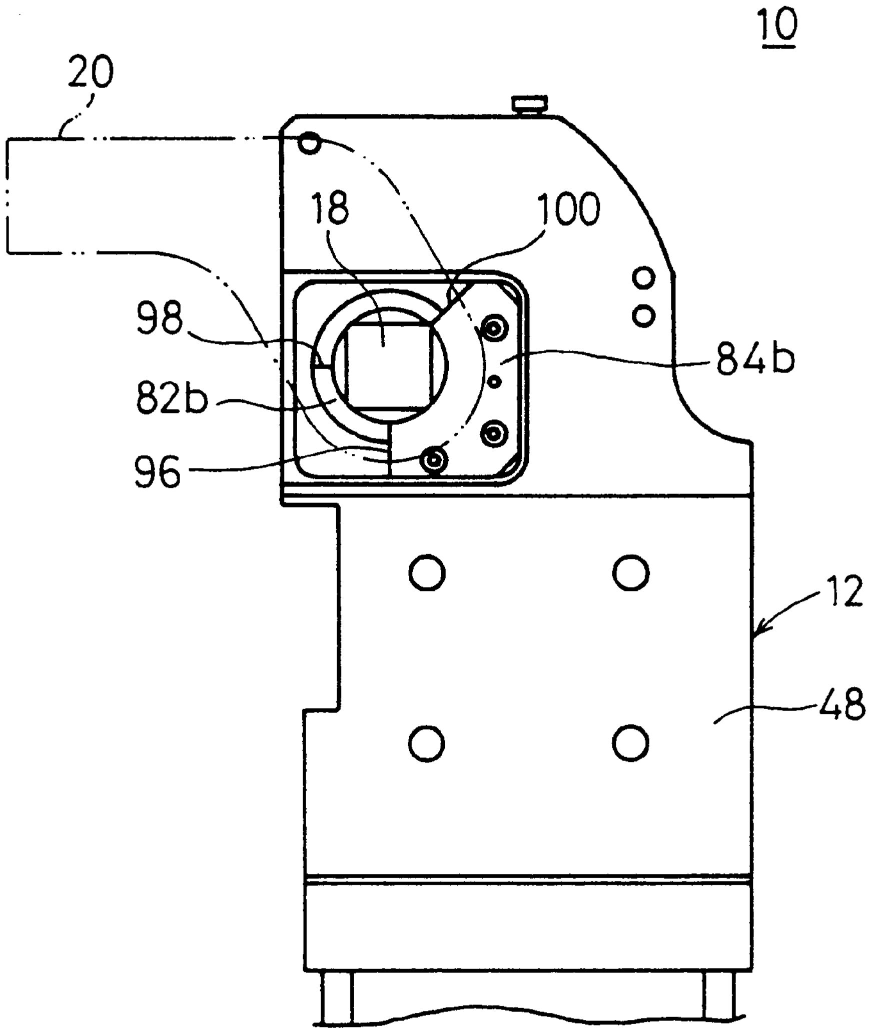
FIG. 10 illustrates the action, depicting a clamping state obtained when the rotary action of the arm is stopped.

At first, the cylinder apparatus 10 is fixed to a predetermined position by the aid of an unillustrated fixing means. First ends of pipes such as unillustrated tubes are connected to the pair of pressure fluid inlet/outlet ports 42*a*, 44*a* (42*b*, 44*b*) respectively. Second ends of the pipes are connected to an unillustrated pressure fluid supply source. FIG. 7 shows the cylinder apparatus 10 in the unclamping state, and FIG. 10 shows the cylinder apparatus 10 in the clamping state. The following description will be made assuming that the unclamping state shown in FIG. 7 represents the initial position.

After performing the preparatory operation as described above, the unillustrated pressure fluid supply source is energized at the initial position shown in FIG. 7 to introduce the pressure fluid from the first pressure fluid inlet/outlet port 44*a* into the cylinder chamber 28 disposed at the lower side. The piston 30 is pressed in accordance with the action of the pressure fluid introduced into the cylinder chamber 28. The piston 30 is moved upwardly along the cylinder chamber 28. During this process, the guiding action is effected by the wear ring 34 which is installed to the outer circumferential surface of the piston 30 and the guide grooves 58 along which the knuckle block 56 makes the sliding movement. Accordingly, the linear accuracy is maintained for the piston 30 and the piston rod 32.

The rectilinear motion of the piston 30 is transmitted to the toggle link mechanism 64 via the piston rod 32 and the knuckle joint 62, and it is converted into the rotary motion of the arm 20 in accordance with the rotary action of the support lever 74 which constitutes the toggle link mechanism 64.

That is, the rectilinear motion (upward movement) of the piston 30 allows the force to act so that the link plate 72 and the knuckle joint 62 engaged with the free end of the piston rod 32 are pressed in the upward direction. Owing to the pressing force exerted on the link plate 72, the link plate 72 is rotated by a predetermined angle about the support point of the first pin member 70, and the support lever 74 is rotated in the direction of the arrow A in accordance with the linking action of the link plate 72.

Figure 8:
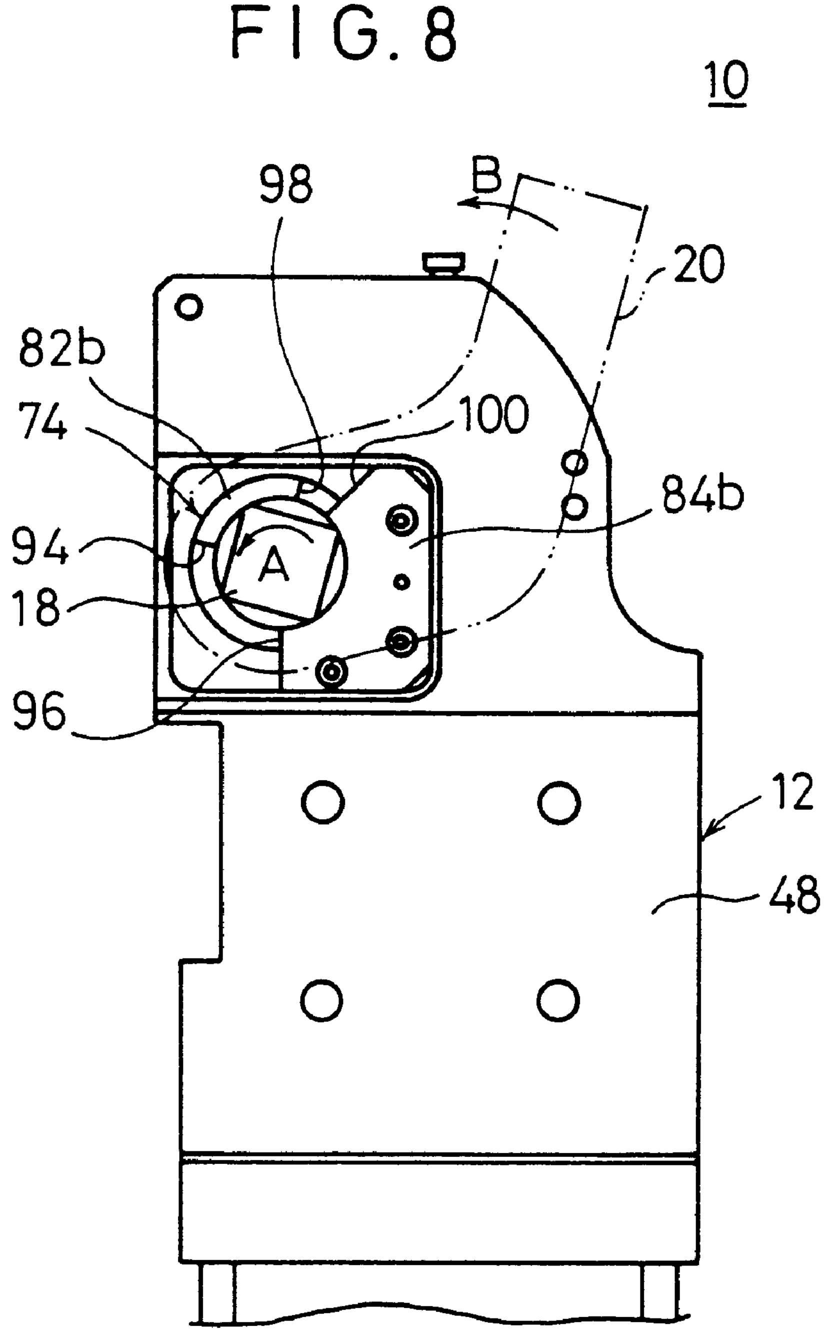
FIG. 8 illustrates the action, depicting a state obtained when the arm makes the rotary action starting from the initial position.
Figure 9:
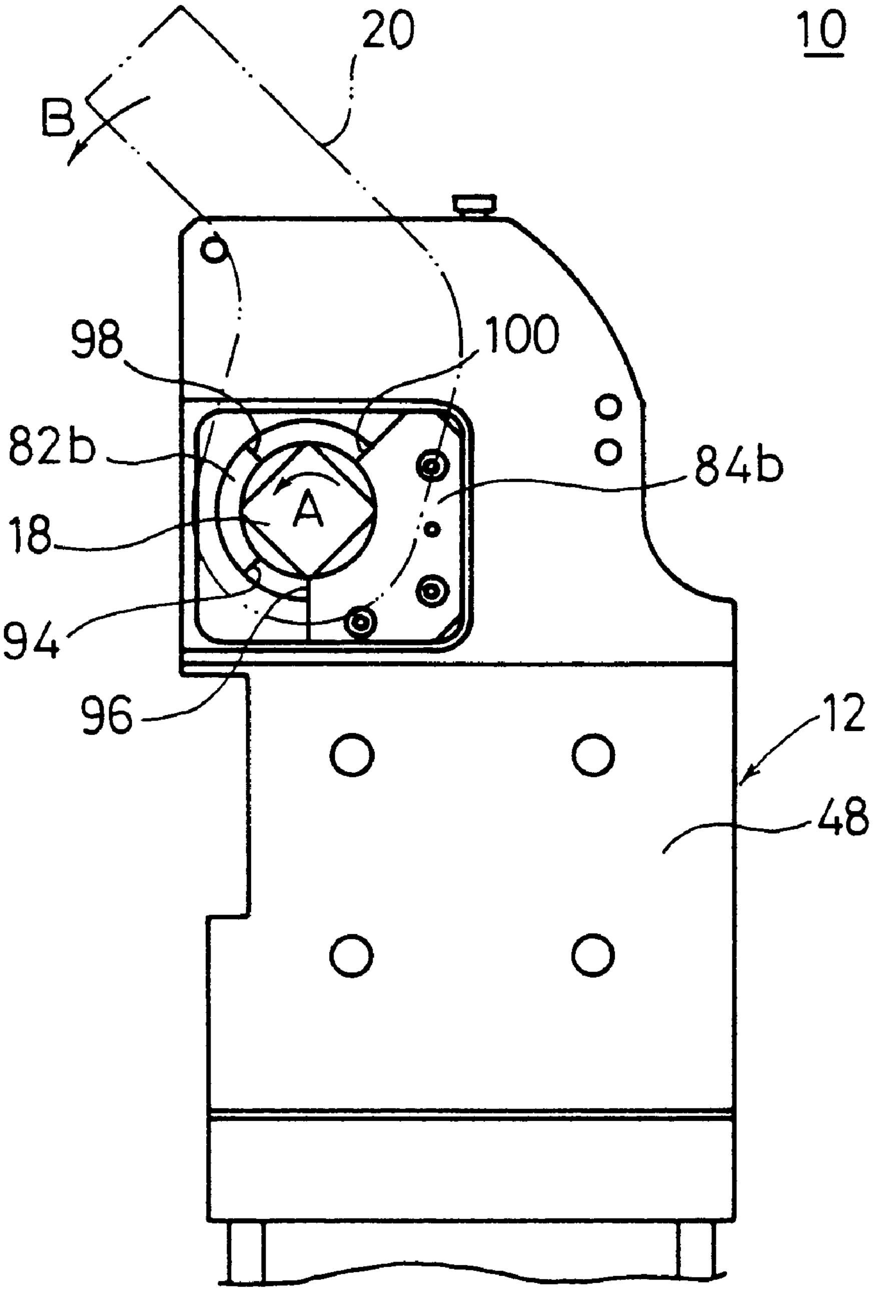
FIG. 9 illustrates the action, depicting a state obtained when the arm further makes the rotary action after the state shown in FIG. 8.

Therefore, the arm 20 is rotated by a predetermined angle in the direction of the arrow B about the support point of the bearing section 18 of the support lever 74. Accordingly, the circular arc-shaped projection 82*b* (82*a*) is rotated by the predetermined angle integrally with the support lever 74 (see FIGS. 8 and 9).

In accordance with the process in which the arm 20 is rotated in the direction of the arrow B as described above, the first end surface 94 of the circular arc-shaped projection 82*b* (82*a*) abuts against the first abutment surface 96 of the plate 84*b* (84*a*) which is fixed to the body 12. Accordingly, the arm 20 stops the rotary action. As a result, the clamping state is given, in which the workpiece is clamped by the arm 20 (see FIG. 10). After the arm 20 stops the rotary action, the piston 30 and the piston rod 32 are slightly moved upwardly. The reaction force, which is exerted when the workpiece is clamped, is received by the reaction force-receiving plates 108 against which the link plate 72 abuts.

On the other hand, when the pressure fluid is supplied to the pressure fluid inlet/outlet port 42*a* in accordance with the switching action of an unillustrated changeover valve in the state shown in FIG. 10, the piston 30 is moved downwardly. Further, the support lever 74 is rotated in a direction opposite to the direction described above by the aid of the link plate 72 in accordance with the downward movement action of the piston rod 32. Accordingly, the arm 20 is rotated in a direction to make separation from the workpiece.

During the process in which the arm 20 is rotated in the direction to make separation from the workpiece, the second end surface 98 of the circular arc-shaped projection 82*b* (82*a*) abuts against the second abutment surface 100 of the plate 84*b* (84*a*) which is fixed to the body 12. Accordingly, the arm 20 stops the rotary action. As a result, the cylinder apparatus 10 is restored to the initial position shown in FIG. 7.

In the embodiment of the present invention, the circular arc-shaped projections 82*a*, 82*b*, which function as the stopper, are exposed to the outside of the body 12 through the substantially circular openings 16*a*, 16*b* formed through the body 12. In other words, the stopper for stopping the rotary action of the arm 20 is provided at the outside of the body 12. Therefore, any dust or the like, which adhere to the circular arc-shaped projections 82*a*, 82*b* and the plates 84*a*, 84*b*, can be conveniently removed only by detaching the cover members 88*a*, 88*b* installed to the body 12 without disassembling the first casing 46 and the second casing 48 for constructing the body 12. Therefore, it is possible to perform the maintenance operation conveniently and efficiently for the circular arc-shaped projections 82*a*, 82*b* and the plates 84*a*, 84*b* which function as the stopper.

Figure 11:
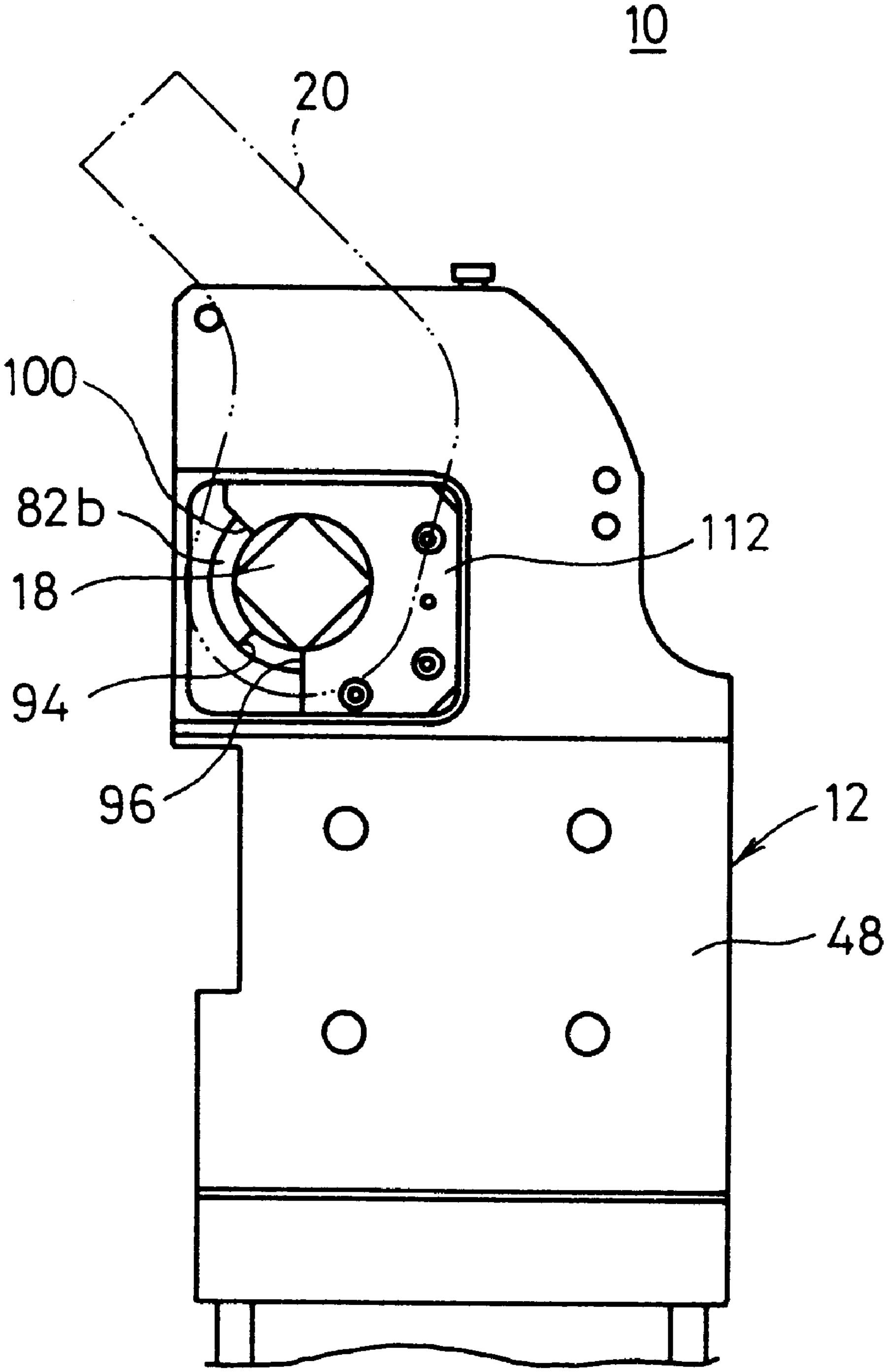
FIG. 11 shows a front view illustrating a modified embodiment of the plate.
Figure 12:
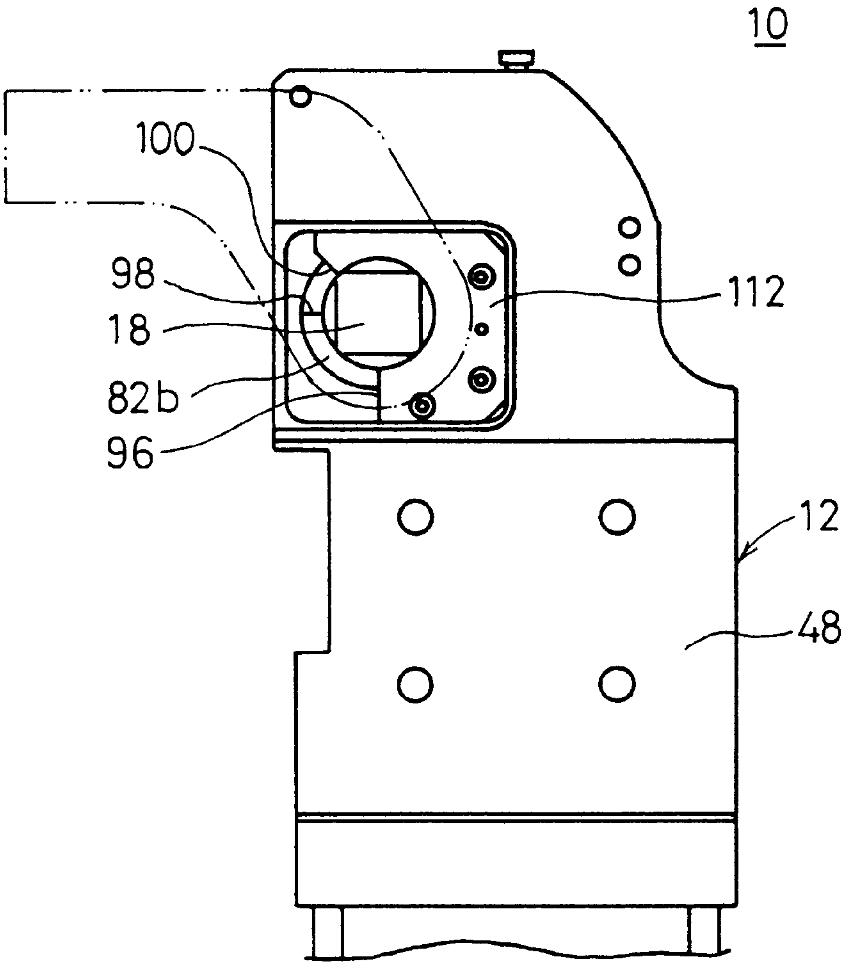
FIG. 12 shows a front view illustrating another modified embodiment of the plate.

In the embodiment of the present invention, the plates 84*a*, 84*b*, which abut against the circular arc-shaped projections 82*a*, 82*b*, are detachably installed to the body 12 by the aid of the screw members 89. Therefore, the present invention is advantageous in that the range of the rotary action of the arm 20 can be conveniently changed to arbitrarily set the angle of the arm 20 at which the arm 20 is in the clamping state, by exchanging the plates 84*a*, 84*b* with other plates 112 having different angles of the first abutment surface 96 and the second abutment surface 100 for making abutment against the circular arc-shaped projections 82*a*, 82*b* (see FIGS. 11 and 12).

What is claimed is:

1. A cylinder apparatus comprising:

a body;

a cylinder unit coupled to one end of said body, for accommodating therein a piston for making reciprocating movement along a cylinder chamber;

a toggle link mechanism provided at the inside of said body, for converting rectilinear motion of a piston rod coupled to said piston into rotary motion;

a rotating support member connected to said toggle link mechanism;

an arm coupled to said toggle link mechanism through said rotating support member, for making rotary movement by a predetermined angle in accordance with a driving action of said cylinder unit; and a stopper provided on said rotating support member and exposed to the outside of said body, for stopping rotary action of said arm.

2. The cylinder apparatus according to claim 1, wherein said rotating support member comprises a support lever which is exposed to the outside through openings formed through said body.

3. The cylinder apparatus according to claim 2, wherein circular arc-shaped projections are formed at both ends of said support lever, and said circular arc-shaped projections stop said rotary action of said arm by making abutment against plates coupled to said body.

4. The cylinder apparatus according to claim 3, wherein said plates are installed detachably to said body.

5. The cylinder apparatus according to claim 3, wherein each of said plates is formed with a first abutment surface for making abutment against a first end surface of said circular arc-shaped projection, and a second abutment surface for making abutment against a second end surface of said circular arc-shaped projection.

6. The cylinder apparatus according to claim 5, wherein a range of said rotary action of said arm is regulated by arbitrarily setting an angel of separation between said first abutment surface and said second abutment surface formed on said plates.

7. The cylinder apparatus according to claim 1, wherein said body includes a first casing and a second casing which are formed in an asymmetric manner, and said first casing and said second casing are detachable while maintaining a state in which said cylinder unit is not disassembled.

* * * * *